United States Patent
Sampath-Kumar et al.

(10) Patent No.: US 6,169,573 B1
(45) Date of Patent: Jan. 2, 2001

(54) HYPERVIDEO SYSTEM AND METHOD WITH OBJECT TRACKING IN A COMPRESSED DIGITAL VIDEO ENVIRONMENT

(75) Inventors: Srihari Sampath-Kumar; P. Venkat Rangan; Kamlesh Talreja, all of San Diego, CA (US); Kenneth J. Goldman, Clayton, MO (US)

(73) Assignee: HOTV, Inc., San Diego, CA (US)

( * ) Notice: Under 35 U.S.C. 154(b), the term of this patent shall be extended for 0 days.

(21) Appl. No.: 08/887,748

(22) Filed: Jul. 3, 1997

(51) Int. Cl.[7] .................................................. H04N 7/18
(52) U.S. Cl. .............................................................. 348/169
(58) Field of Search .................................. 348/169, 170, 348/171, 172; H04N 7/18

(56) References Cited

U.S. PATENT DOCUMENTS

| | | | |
|---|---|---|---|
| 5,583,994 | 12/1996 | Rangan | 709/219 |
| 5,610,653 * | 3/1997 | Abecassis | 348/170 |
| 5,809,512 * | 9/1998 | Kato | 707/502 |
| 5,872,857 * | 2/1999 | Chodos | 348/171 |

\* cited by examiner

Primary Examiner—Howard Britton
(74) Attorney, Agent, or Firm—Donald R. Boys; Central Coast Patent Agency

(57) ABSTRACT

A system and method for hypervideo object tracking in a compressed digital video environment includes a hypervideo authoring system and a hypervideo browser. The hypervideo authoring system permits one or more moving objects in an MPEG compressed video clip to be identified, tracked, refined, edited, and associated with a specified action with a minimum of user intervention. The hypervideo browser allows the MPEG video to be viewed and objects of interest to be selected by a user, thereby hyperlinking to additional information of interest.

28 Claims, 13 Drawing Sheets

HYPERVIDEO SYSTEM AND METHOD WITH OBJECT TRACKING IN A COMPRESSED DIGITAL VIDEO ENVIRONMENT

The invention of this patent was developed, in part, using government funds from the National Science Foundation under grant CCR-94-12711 and the Defense Advanced Research Projects Agency (DARPA) under contract DABT-63-95-C-0083. As such, the government has certain rights in the invention and any ensuing patents.

BACKGROUND OF THE INVENTION

The invention relates to a system and method for hypervideo browsing and linking among moving objects represented in a compressed digital video context, and more particularly to a system and method capable of following objects in changed positions from frame to frame by using motion vectors present in an MPEG-compressed digital video stream or other video stream encoded by a method utilizing motion compensation techniques.

Video has traditionally been recorded on analog media, in which an electrical signal (such as that used by a television receiver) is directly encoded onto a storage medium, such as magnetic tape or a laserdisk. From a technological point of view, analog video encoding and transmission are relatively simple to accomplish; color television uses standards that are nearly fifty years old.

However, analog video has several significant disadvantages. First of all, the signal quality of analog video degrades when sent over long distances, stored and retrieved, or otherwise manipulated in the analog domain. Although precision electronics and strictly controlled environments can minimize the degradation, it generally cannot be completely eliminated. Second, analog video is typically not directly understood by computers. With the increasing convergence between computers and multimedia, this is an important consideration.

Digital encoding, on the other hand, uses the language of computers for the storage of video. There is an increasing trend toward storing and transmitting video that has been digitally stored. For example, the new DVD (Digital Versatile Disk) standard, as well as certain direct-broadcast satellite television systems (such as Hughes Electronics' "DirecTV" system), and several proposed standards for HDTV (high-definition television) all employ digital video encoding. Such digital video, because it is based on a sequence of numerical codes that can be, to some extent, reconstructed if a signal is damaged, does not suffer the degradation problems inherent in analog video. Digital video can be transmitted, received, stored, and retrieved without any necessary loss in signal quality.

Tracking objects in video may be of interest for a number of reasons. One application that has been identified is known as hypervideo. In hypervideo, video clips can be used to link to and from different topics of interest, much as hypertext is commonly used for linking among topics on the World Wide Web. In hypertext, various words in a passage of text may be highlighted, thereby indicating the user that they contain a link to another area. If the user selects (e.g., clicks on) a highlighted word, the text corresponding to the selected word will then be displayed, which may in turn contain additional links.

Hypervideo can work in much the same way. A video clip may contain certain objects which are linked to further information. If the user selects an object, for example a red automobile, he may then be presented with additional information about the automobile, or may be shown a different video clip or a different segment of the same clip, which may in turn contain additional links.

However, in hypervideo applications, it has been found to be necessary to track the individual objects within the video clips used. If the exemplary automobile is moving, it is useful for the hypervideo system to be able to determine whether the user has selected the automobile, regardless of where it is on the screen when the selection is made.

Where the video is artificially prepared, as by computer graphics, this is relatively easy. In order to construct the video, the positions of objects therein are specified on a coordinate system. That information can be then used to track the objects, if desired.

However, when the video is prepared from other sources, such as a recording of a real-world scene, or transferred from film, object tracking becomes far more difficult. The video becomes simply a sequence of frames, wherein each frame represents a still picture or "snapshot" of a particular moment in time. The snapshots contain visual information sufficient to permit the human brain to distinguish individual objects, but a computer usually cannot easily do so.

In digital video applications, each frame contains a pattern of colored picture elements, or "pixels," which the human eye and mind are easily able to interpret as a scene. For example, a digital video may represent a red automobile traveling down an asphalt highway. Digitally, the auto would be represented as an irregularly-shaped region of red and near-red pixels. A human observer would easily be able to discriminate this pattern from its surroundings.

However, computer applications typically do not have this ability. In a typical computer display memory architecture, the red and near-red pixels representing the auto may be scattered throughout the frame, one line or "raster" at a time, interleaved with various other objects. Moreover, the auto may pass behind certain objects (for example, a tree on the side of the road). Even if a sophisticated computer system is able to recognize an automobile in a video frame by its shape, this ability may be reduced or confused when the auto is partially obscured.

Further complicating this problem is the issue of video compression. Uncompressed, a single frame of relatively low-resolution video (e.g. 352×240 pixels), in full color, can require a storage capacity in excess of 250,000 bytes (250K). As a single second of video includes approximately 30 frames, a five-minute video would then require more than 2,000 megabytes. This amount of storage is impractical, especially when it is considered that a typical feature-length movie is longer than 90 minutes (which would require nearly 40 gigabytes, or 40,000,000,000 bytes, of storage).

Digital video compression can reduce these requirements by a factor of 25 or more. One standard frequently used for the compression of digital video is known as MPEG, for the Moving Picture Experts Group which established the standard. Using MPEG, approximately 60 minutes of relatively low-resolution video (as defined above) can be stored in approximately 650 megabytes of storage, or on a single CDROM disk. MPEG is a "lossy" compression technique, which means that the high degree of compression accomplished has a downside. There is a loss of detail in the video. This loss of detail may or may not be easily visible to the casual observer, but intricate details within individual video frames may be washed out somewhat. This loss of information makes the task of tracking objects represented in the video even more difficult.

A commercial hypervideo and object tracking tool called V-ACTIVE is available from Ephyx Technologies. However, the current hypervideo implementation of V-ACTIVE has at least four notable characteristics. First, objects are tracked by way of hot regions having regular shapes and fixed sizes. These shapes must be specified by the hypervideo author. For example, the hot region for a moving automobile might be represented by a rectangle. Second, the concept of "hypervideo" is limited in its ability to link among scenes in a single video clip: only one sequence through a video document is available. Third, V-ACTIVE has difficulty tracking objects that become partially or wholly obscured for even a few frames. Finally, V-ACTIVE does not appear to be able to track motion in compressed video without first fully decompressing the video.

Accordingly, there is a need for a hypervideo object tracking system and method that does not suffer from the disadvantages of prior art hypervideo authoring tools. Such a tracking system would work on digitally stored video, preferably already in the compressed domain. Trackable objects should be able to have any arbitrary shape, and the tracked "hot regions" should be able to adapt to a changing shape. The system should be able to track an object even when it is partially obscured. The hypervideo system should track objects through multiple paths between scenes or segments in a single video. Finally, a hypervideo object tracking system should be flexible and easy to use.

SUMMARY OF THE INVENTION

The present system and method for tracking objects solves many of the disadvantages of prior object tracking systems.

The present object tracking system and method uses hardware and software capable of isolating and tracking objects within MPEG-compressed digital video. As object tracking is performed in the compressed domain, video storage requirements are reduced substantially in comparison to systems utilizing uncompressed digital video. Moreover, there is no loss of video quality that otherwise might result from decompressing the video, performing operations on it, and recompressing it. Performing video tracking in the compressed domain has also been found to be extremely fast in comparison to techniques which require complete decompression prior to tracking.

The present object tracking system is able to determine the bounds of objects to be tracked within the compressed domain. Such object can be of any arbitrary shape or size. As the object is tracked, any changes in shape or size are also tracked by the system. The system is frequently able to continue to track an object even when it becomes partially obscured by another object in the foreground. All of these abilities derive from the invention's use of shape and motion information embedded within an MPEG-compressed digital video file.

In hypervideo applications, the invention is able to follow a selected path chosen from multiple paths through a single video clip. When the user selects an object within a video, the invention may be caused to switch from one path through the video clip's various scenes or segments to another path. A hypervideo object tracking system according to the invention can be used in DVD, Internet video streaming (such as on the World Wide Web), and numerous other applications.

Finally, the invention is flexible and easy to use, particularly in comparison to other object tracking systems. In a hypervideo authoring session, the invention is able to automatically detect the edges of a desired object based on information encoded into the compressed MPEG video. The invention can then track the desired object through the video clip, even frequently across scene changes. Finally, if the invention errs in detecting object boundaries or tracking an object, any incorrect tracking information can be erased by the user when it first appears, and such erasures will be propagated as tracking is performed through the remainder of the video clip.

The invention operates by locating scene transitions within an MPEG video clip and identifying where a scene might pick up later after any intervening scenes. Within each scene, the hypervideo authoring system allows an author to indicate the location of objects of interest simply by clicking upon them. The authoring system will then locate the boundaries of the objects and track their movement without the need for substantial further intervention. If the automatic tracking algorithm errs at any point in following an object's motion, the error can be corrected by the author, and the corrected information will be utilized to track the object.

The tracked object information is then used by a hypervideo browser to allow a user to select moving objects within a full-motion MPEG video and thereby "hyperlink" to additional information or new contexts.

DESCRIPTION OF THE PREFERRED EMBODIMENT

As required, a detailed illustrative embodiment of the present invention is disclosed herein. However, a system and method for hypervideo object tracking in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
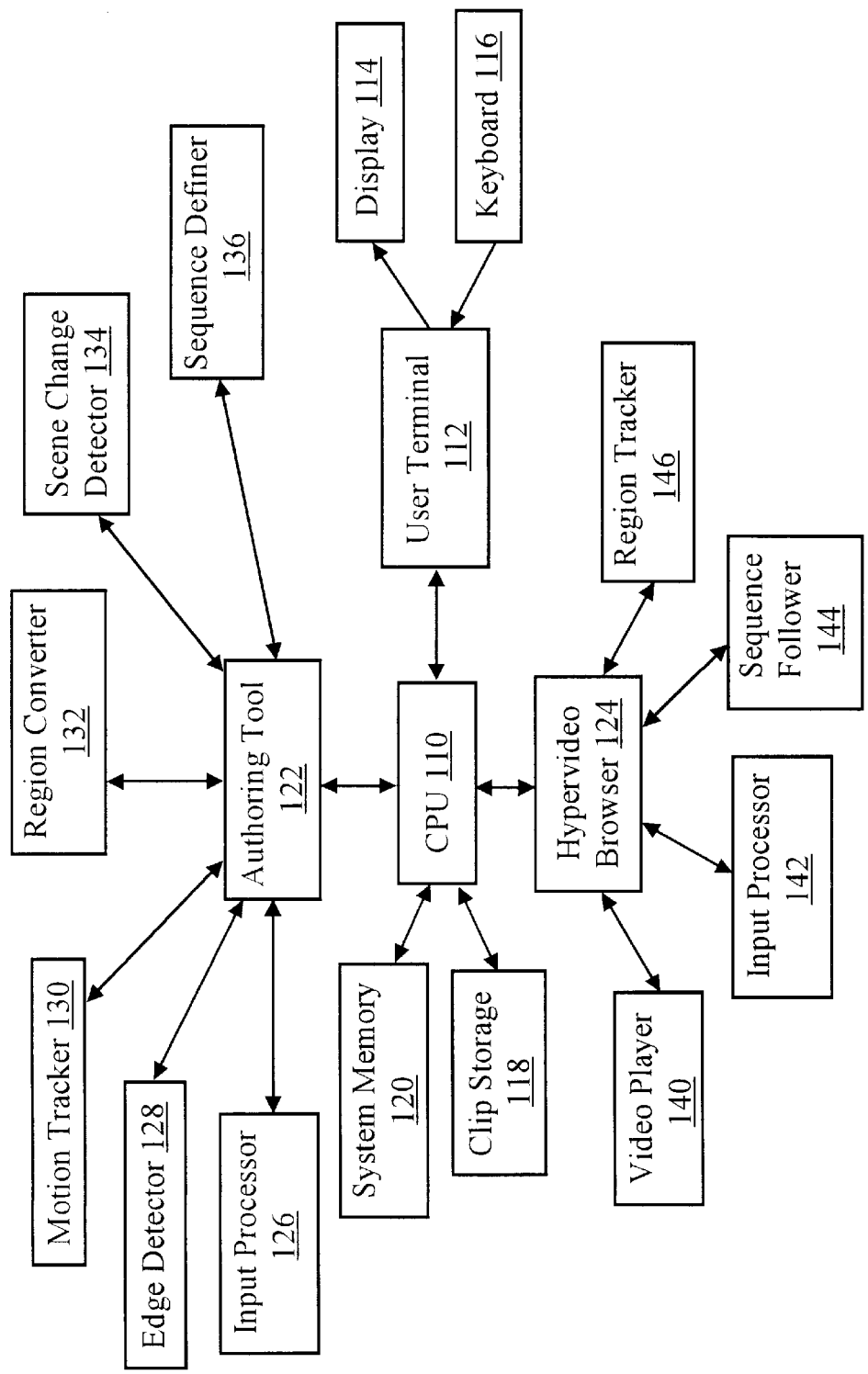
FIG. 1 is a block diagram of an object tracking system incorporating a hypervideo authoring system and a hypervideo browser according to the invention.

Referring initially to FIG. 1, a block diagram of a system according to the invention is shown. The system includes a central processing unit or CPU 110, which may be a general purpose CPU, of the type used in personal computers, workstations, or other computers, or may be specially adapted to this application. The CPU 110 is coupled to a user terminal 112, through which user interaction is performed. The terminal 112 includes a display unit 114 capable of displaying digital video clips and communicating information to a user. The terminal 112 further includes a keyboard 116 and/or other input devices, such as a mouse or digitizing tablet.

The system of FIG. 1 operates on video clips stored in MPEG format within a clip storage unit 118. For purposes of manipulation, a clip in the storage unit 118 may be transferred to system memory 120, as is customary with digital computers, and then transferred back to the storage unit 118 when processing is completed.

The invention is performed primarily by two processing components: a hypervideo authoring tool 122 and a hypervideo browser 124. Although the authoring tool 122 and browser 124 will be discussed herein as primarily software in nature, it should be noted that either or both of these components can be performed via hardware, firmware, software, or a combination of the foregoing.

The authoring tool 122 includes a set of subsystems, the detailed functions of which will be discussed in further detail below. An input processor 126 receives input from the user terminal 112, allowing a user to specify an object to track and otherwise interact with the system. If the input received from the user terminal 112 is not sufficient to fully identify the boundaries of an object to be tracked, an edge detector 128 uses information encoded into an MPEG video clip to determine the shape and size of the object specified by a user. A motion tracker 130 follows any specified objects through a sequence of frames in an MPEG video. A region converter 132 allows a tracked region to be defined in terms of one or more polygons or other shapes; this is typically a more efficient representation than a collection of selected bits, although a bitmap representation may also be used. A scene change detector 134 determines where in an MPEG video clip scene transitions occur, allowing objects and regions to be tracked across scene changes. A sequence definer 136 allows a user to specify one or more alternate paths through a sequence of scenes in a video clip, which may be selected through the hypervideo browser 124. Although software is presently preferred for the implementation of the foregoing subsystems, any or all of them can be performed via hardware, firmware, or software.

The hypervideo browser 124 also includes several subsystems. A video player 140 is used to display an MPEG video clip as a sequence of frames on the display unit 114. An input processor 142 receives data from the user terminal 112, allowing a user to select one or more tracked objects for control and hyperlinking purposes, as will be discussed in further detail below. A sequence follower 144 follows one or more predetermined paths among scenes in an MPEG video clip according to instructions from a user. A region tracker 146 uses information provided by the authoring tool 122 to allow regions corresponding to objects within an MPEG video to be tracked and selected by a user operating the browser 124.

Figure 2:
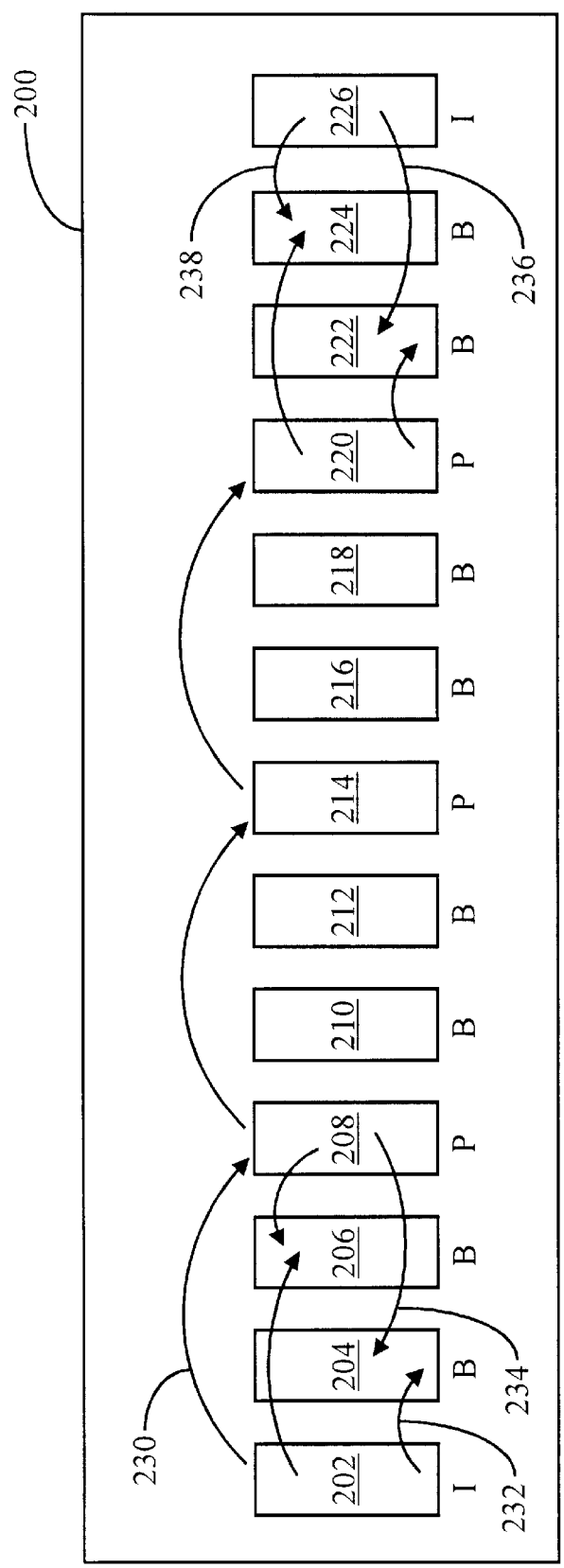
FIG. 2 is a diagram illustrating the relationship among MPEG I, P, and B frames.

FIG. 2 illustrates the internal structure of an MPEG compressed digital video file of the type employed by the invention. When an MPEG compressed video is encoded from an uncompressed source, the encoder utilizes motion compensation techniques to predict the contents of certain frames. A segment 200 of an MPEG video file is shown, including thirteen individual frames 202–226. There are three types of frames present in a typical MPEG video file: I frames, P frames, and B frames.

I frames (such as frames 202 and 226) are "intra" coded. In other words, each frame of I type is not based on predicted contents from any other frame. An I frame is compressed standing alone by means described in the MPEG specification. An I frame is divided into "macroblocks," which in one embodiment are square regions, 16 pixels by 16 pixels. Each macroblock within an I frame is separately compressed and stored within the MPEG clip 200. I frames can be decoded without referring to any other frame, and thus serve as resynchronization and random access points.

P frames (such as frames 208, 214, and 220) are "predictive" coded. In other words, such frames are compressed by exploiting redundancy (i.e. lack of change) within the frame and between the P frame and the immediately prior P or I frame (arrow 230). P frames are also divided into macroblocks. Each macroblock within a P frame is either encoded by itself (like a similar macroblock within an I frame would be) or defined based on a comparison to a reference region in the preceding frame from which the P frame is predicted. The reference region in the prior frame need not be in the same location; a "motion vector" is used to point from a particular P frame macroblock to the reference region in the preceding frame from which the motion is predicted. Each macroblock within a P frame may have a different motion vector.

B frames (such as frames 204, 206, 210, 212, 216, 218, 222, and 224) are "bidirectionally" coded. That is, such frames are compressed by exploiting redundancy (i.e. lack of change) within the frame and between the B frame and the immediately prior P or I frame (arrow 232) as well as the succeeding P or I frame (arrow 234). Each macroblock within a B frame can have two motion vectors: one pointing to a corresponding reference region in the preceding P or I frame, and one pointing to a corresponding reference region in the closest following P or I frame.

Although the segment 200 is shown as comprising two I frames, three P frames, and eight B frames, it should be noted that this particular structure is for illustrative purposes only. Actual MPEG compressed video files may contain practically any number of I, P, and B frames in nearly any order, depending on the encoder used to generate the file and what it determines to be the most efficient arrangement. However, the interrelationships among I, P, and B frames discussed above remain in effect regardless of the particular frame arrangement.

Figure 3:
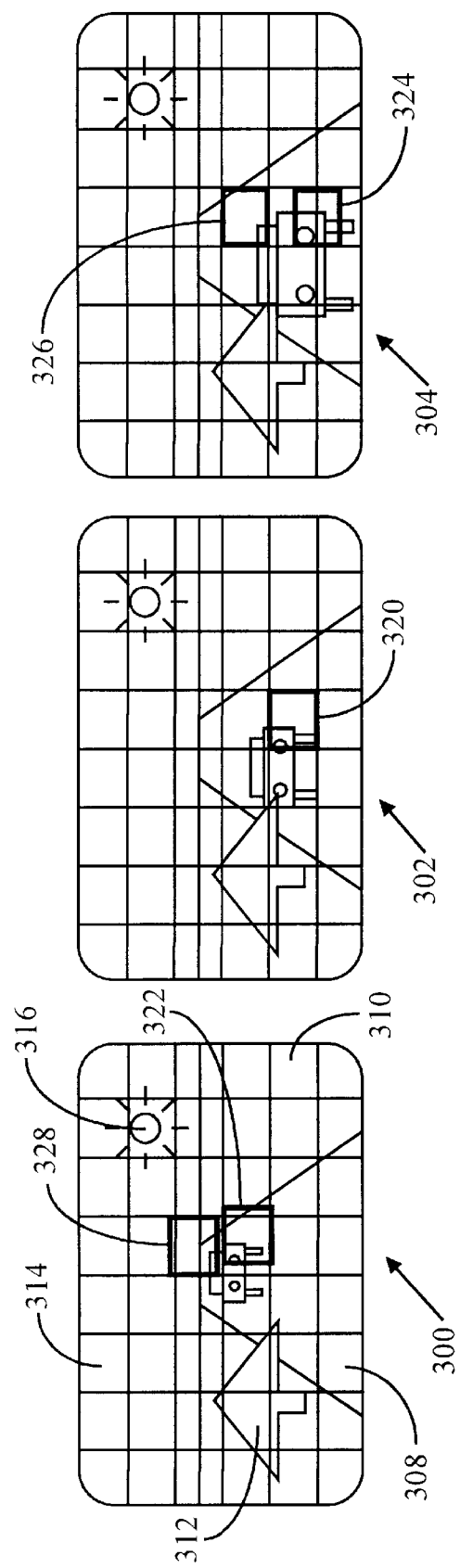
FIG. 3 is a diagram illustrating motion compensation from an I frame to a P frame and a B frame.

Motion prediction can be seen more clearly in connection with FIG. 3, which shows an exemplary I frame 300, B frame 302, and P frame 304. Each frame includes a red car 306 traveling down an asphalt road 308 through a wheat field 310 next to a single pine tree 312. A sky region 314 includes a sun 316. Although colors are not expressly depicted in FIG. 3, one can imagine that the frames include a number of different shades: red car, gray road, beige wheat, green tree, blue sky, and yellow sun, for example, although numerous intermediate shades are also possible, particularly if the frames come from a film or video recording of a real-world scene.

A bidirectional macroblock 320 is shown in the B frame 302 of FIG. 3. As discussed above, a B frame macroblock can be predicted based on information in a prior I or P frame and a later I or P frame. In this illustrative example, the bidirectional macroblock 320 is predicted from, and has motion vectors pointing to, a first 16 by 16 pixel region 322 in the preceding I frame 300 and a second 16 by 16 pixel region 324 in the following P frame 304. The motion vector pointing to the corresponding region in the preceding reference frame, in this case the I frame 300, is known as a forward motion vector. The motion vector pointing to the corresponding region in the following reference frame, in this case the P frame 304, is known as a backward motion vector. Note that neither the first region 322 nor the second region 324 need be aligned to a macroblock boundary within their respective I frame 300 or P frame 304. Note further than the first region 322 and the second region 324 need not be identical to the bidirectional macroblock 320, only similar enough to justify space savings arising from comparing the regions rather than encoding a new intra-coded macroblock.

Similarly, a predicted macroblock 326 is shown in the P frame 304 of FIG. 3. The predicted macroblock 326 is predicted from information in, and has a forward motion vector pointing to, a third 16 by 16 pixel region 328 in the preceding I frame 300. Note, again, that the third region 328 need not be aligned to a macroblock boundary within the I frame 300.

The motion vectors corresponding to the macroblocks 320 and 326 are encoded into the MPEG file when the compression is performed, and the invention need not be concerned with how the motion vectors were derived. In practice, the motion vectors typically are created by comparing each macroblock of a P or B frame with a large number of 16 by 16 regions in the preceding reference frame, starting with a zero motion vector (no motion) and working outward. When an acceptable match is made, that motion vector is used. If an MPEG file is created by a reasonably efficient encoder, it has been found that the macroblock motion vectors will closely represent the actual motion of an object depicted in the video clip, allowing a system according to the invention to track the object.

The sun 316 is in the same position in the I frame 300, the B frame 302, and the P frame 304. Accordingly, the forward motion vector for the macroblock containing the sun 316 in the P frame 304 will be zero, since the sun 316 is not moving. Similarly, both the forward motion vector and the backward motion vector for the macroblock containing the sun 316 in the B frame 302 will also be zero.

It is stated above that I frames are intra coded, and are not based on any predicted motion information. However, the B frames (e.g., frames 222 and 224 in FIG. 2) immediately preceding each I frame (e.g., frame 226) have macroblocks that depend on regions within the succeeding I frame 226 (see arrows 236 and 238). Accordingly, the motion vectors for these B frame (222, 224) macroblocks can be used to track objects into the I frame 226, and beyond, in accordance with the invention. This process will be discussed in further detail below.

Figure 4:
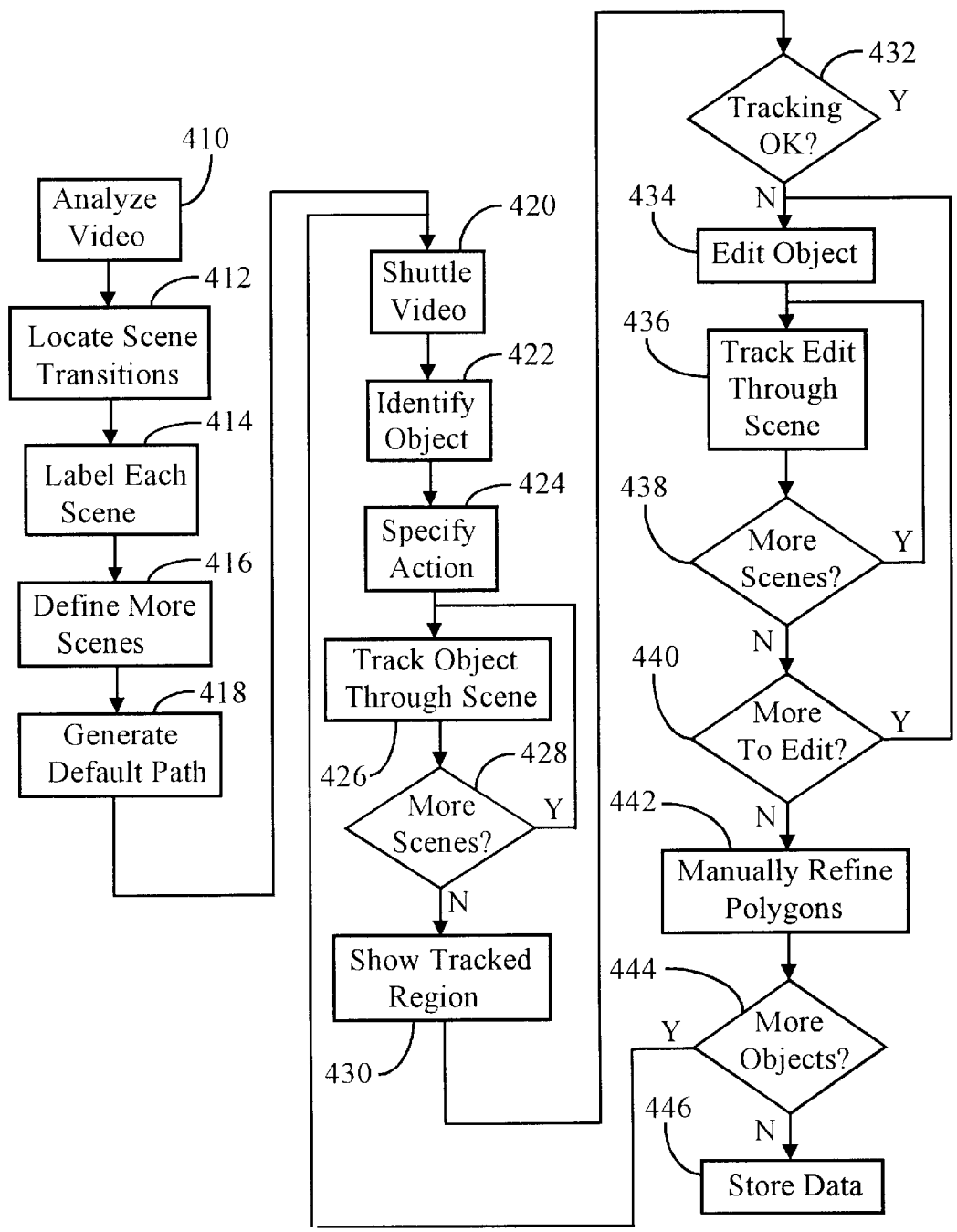
FIG. 4 is a flowchart detailing the functions performed by the authoring system of FIG. 1.

The operation of the authoring tool 122 (FIG. 1) is shown in the flowchart of FIG. 4. The authoring tool 122 operates on an MPEG video clip of the type represented by the sequence of frames 200 (FIG. 2). First, the video is analyzed (step 410). At this time, the video is broken down into individual frames. Each macroblock within a frame includes separate brightness (also known as "luminance," or "Y") and color (also known as "chrominance," or "C") components. As discussed above, typical macroblocks are 16 by 16 pixels in size. However, compressed brightness and color components within each macroblock are specified in terms of blocks no smaller than 8 by 8 pixels. Within each 8 by 8 block, MPEG frame Y and C information components are compressed separately by means of a mathematical procedure known as the discrete cosine transform. The practical result of this transform is that a block's Y and C components have a "DC" coefficient, or value, which specifies an average brightness or color for the entire block, followed by additional coefficients which specify additional detail within the block.

The DC coefficients for Y and C values are used by the invention for several purposes. It should be noted that, as above, MPEG I frames can be decoded without reference to other frames. However, the DC coefficients for blocks in P and B frames must be determined in accordance with the corresponding areas in the frame's reference frames. As the reference areas (specified by the current frame's motion vectors) may not be aligned to block boundaries in the reference frames, contributions from two to four DC coefficients from each reference frame may be combined to derive the DC value for each Y and C block in the current P or B frame.

After the video is analyzed and DC coefficients are determined for each block in each frame of the video, scene transitions in the video are located (step 412). This can be accomplished by the algorithm set forth in Meng and Chang, "CVEPS: A Compressed Video Editing and Parsing System," ACM Multimedia Conference, Boston, Mass., November 1996; and Yeo and Liu, "Rapid Scene Analysis on Compressed Video," IEEE Transactions on Circuits and Systems for Video Technology, v. 5, n. 6 (December 1996), pp. 533–544; both of which are incorporated by reference herein as though set forth in full. Alternatively, any algorithm capable of identifying wholesale changes in video contents can be used to determine where scene transitions occur.

Thereafter, each scene or segment so located is uniquely identified and labeled (step 414). If the automatic scene transition detection algorithm employed in step 412 did not accurately identify all scene transitions, then a user may further identify additional scene transitions (step 416), which are then also labeled. All identified scenes are combined into a default path (step 418), which comprises a list of the scenes in their original sequence in the video. As will be discussed in further detail below, alternative paths (or sequences through the scenes) can be specified and employed by the hypervideo aspects of the invention.

The user can then control the playback of the video, shuttling it forward and backward to localize objects of interest (step 420). An object of interest is then identified by the user (step 422) when it first appears. This can be accomplished manually, by the user "painting" a bitmap over the object of interest or by drawing a polygon or other shape surrounding the object. Preferably, the object of interest is identified by simply pointing and clicking, and the boundaries of the object are located automatically by the invention (as will be discussed in further detail below in conjunction with FIG. 5). In either case, the object of interest is ultimately specified by way of a bitmap "hot region" in the first frame in which the object appears.

If a regular polygon or shape representation is desired by the author, then that shape is drawn over the desired object.

In one embodiment of the invention, the selected shape will then be preserved as the object is tracked. This shape preservation operation is performed when a tracked hot region is converted into a polygon or regular shape representation, as described below with reference to FIG. 12.

For the identified object, a hypervideo linking action is then specified (step 424). The linking action is the action to be taken by the hypervideo browser 124 (FIG. 1) when the object of interest is selected by a user of the browser 124. For example, clicking on an object may result in a link to textual information, visual information, as hyperlinking is presently known and commonly employed, or may result in a link to a different segment of the MPEG video, or to a different path through the video in connection with the invention.

The identified object is then tracked through the remainder of the scene (step 426). This process will be described in further detail below in connection with the flowcharts of FIGS. 6 through 9. When the end of the scene is reached, the remainder of the video is searched to determine if the identified object can be tracked through additional scenes (step 428). This process will be described in further detail below in connection with the flowchart of FIG. 8.

The tracked region is then displayed (step 430) to the hypervideo author. At this time, the author may specify additional hypervideo linking actions to complement or supersede previously specified actions. Accordingly, the specified linking action for a tracked object may change over the duration of the existence of a tracked object. The author can also determine at this time whether the tracking was accurate and successful.

If not (step 432), an object editing procedure is employed. The tracked region is edited, or erased, by the hypervideo author (step 434) by painting or drawing an erasure bitmap in the first frame where an error appears. The edit is then tracked forward through the remainder of the scene (step 436). This edit tracking is repeated if there are additional scenes through which the tracking occurred (step 438). The whole editing procedure can also be repeated if there are more regions to edit (step 440).

As will be discussed in further detail below, the tracking (step 426) and editing (step 436) operations performed by the invention typically result in polygons or shapes corresponding to each frame which represent the tracked objects. The shapes of the polygons can then be modified or manually refined (step 442) by the author, if desired, to further reduce any tracking error. If there are more objects in the video to identify and track (step 444), then the video can be shuttled back and forth to identify and track those objects (beginning at step 420) as well. Each object will be tracked separately by the invention, to avoid any possibility that overlapping hot regions will result in an accidental merge between the regions. This would cause, essentially, one large object to be tracked.

When identification and tracking are complete, the polygon information and hypervideo linking actions are stored in a user-defined stream in the MPEG video file (step 446). The format of such a user-defined stream can be whatever syntax is most efficient to the invention; it will be ignored by any MPEG video decoder that does not employ the invention.

Figure 5:
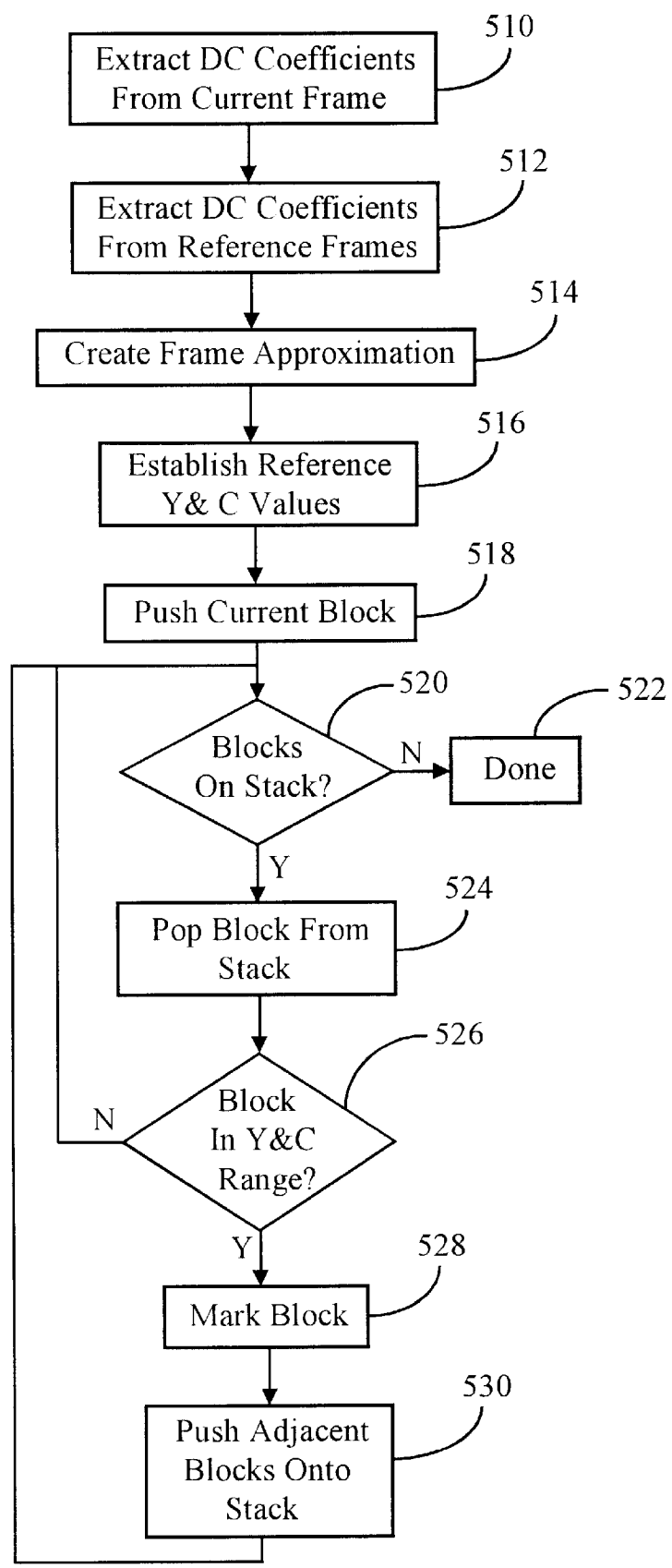
FIG. 5 is a flowchart illustrating the object edge detection algorithm utilized by the authoring system of FIG. 1.

The automatic object identification algorithm utilized by the invention is described by the flowchart of FIG. 5. This procedure is employed to locate the boundaries of an object of interest based on the location of a single point within the object. First the DC Y and C (brightness and color) coefficients are extracted from the current frame (step 510), as performed in the analysis procedure (step 410). The coefficients are also extracted from the current frame's reference frames (step 512), if any, so that an approximation of the current frame can be created (step 514) from the DC coefficients. This approximation is used to locate the object boundaries. Reference Y and C values are established (step 516) from values at the point where the hypervideo author selected the object. The location of the current block is then pushed onto a stack (step 518).

If there are no blocks left on the stack (step 520), the identification procedure is complete (step 522). If there are blocks remaining, a block is popped from the stack (step 524). If the Y and C values of the block popped from the stack are within a range of values specified by the hypervideo author (step 526), then the entire block is marked as part of a hot region (step 528). For example, if 8-bit values are used to specify Y (brightness), Cb, and Cr (two color values), then a threshold value of ±20 may be used to locate sufficiently close brightness and color values. In other words, if the brightness or color of a block being tested differs from the reference block by more than 20 (out of 256) units, then the boundary of the object will be located there. After a block is marked as hot, all adjacent blocks are then pushed onto the stack (step 530).

The state of the stack is then queried again (step 520) until there are no blocks left to test (step 522). When this procedure is complete, all similarly colored blocks adjacent to the one selected by the author will have been marked as hot. This pattern of blocks is then converted into a bitmap to be tracked by the invention.

Figure 6:
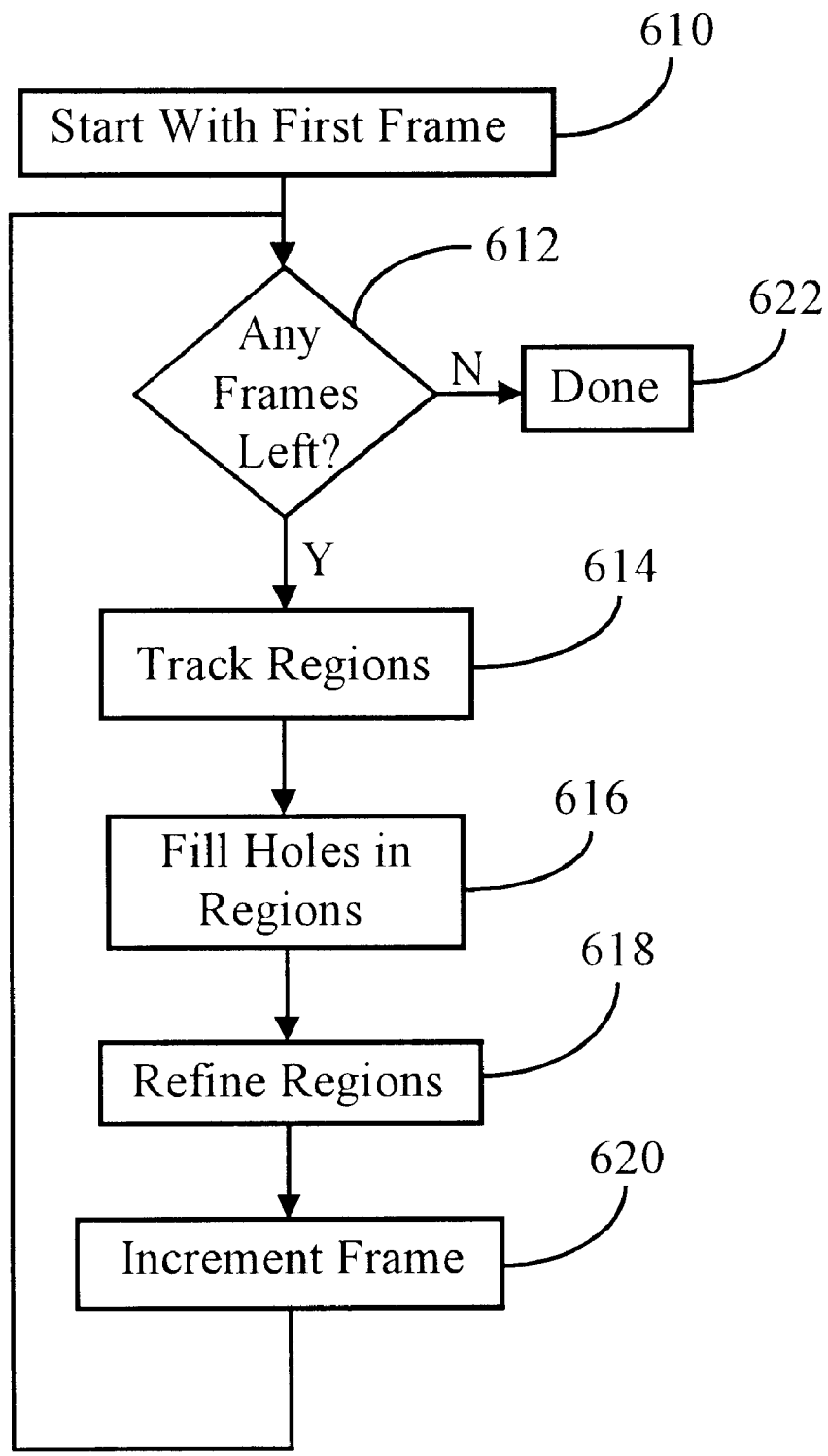
FIG. 6 is a flowchart illustrating an overview of the object motion tracking process utilized by the authoring system of FIG. 1.

An overview of the tracking operation is described in FIG. 6. The tracking operation begins in the first frame in which the object of interest was identified by the hypervideo author (step 610). If any frames follow within the scene (step 612), hot regions are tracked from the current frame's reference frames, if any, to the current frame (step 614). The algorithm for performing the tracking operation is described below with reference to FIG. 7. If any holes or gaps are found in the resulting hot regions, then these holes are filled (step 616). The hole-filling operation is also described below; see FIG. 8. The resulting hot regions are then refined into one or a small number of large regions (step 618); extraneous regions are either merged into the large regions or deleted, and the hot regions are converted into simple polygons or shapes for storage (but not for subsequent tracking). The refinement algorithm is described below; see FIG. 9.

After the tracking, hole-filling, and refinement operations are performed by the invention, the frame number is incremented (step 620) in decode order, not display order, and the same operations are performed on succeeding frames. The tracking operation is performed on the frames in decode order because, as discussed below, certain reference frames must be decoded before they are displayed, in order to permit earlier-displayed bidirectional frames to be decoded properly. If no frames are left (step 612), then the scene is complete and object tracking is finished for the scene (step 622). As discussed above, tracking may continue through additional scenes (step 428, FIG. 4).

Figure 7:
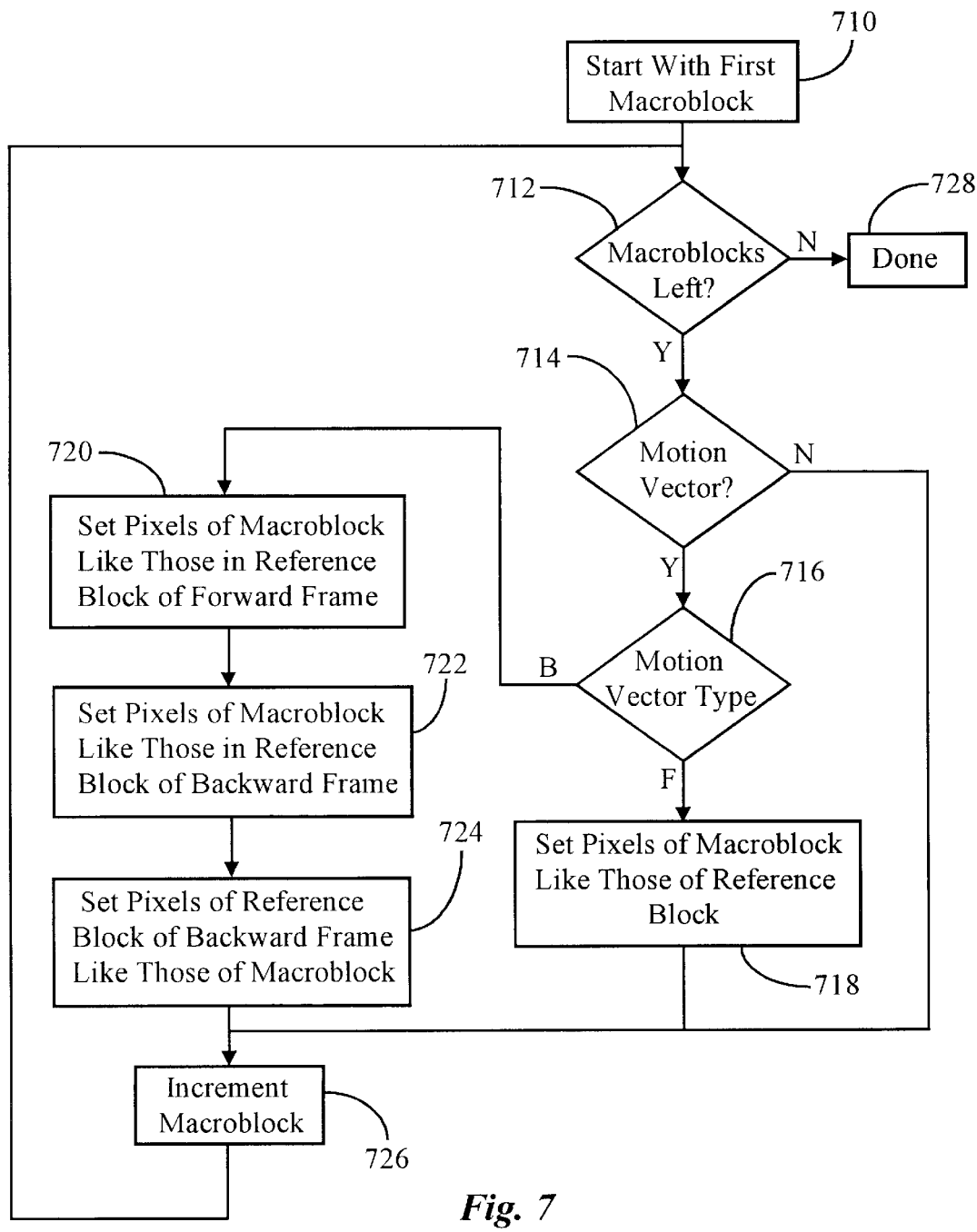
FIG. 7 is a flowchart illustrating the detailed object tracking algorithm employed in the motion tracking process of FIG. 6.

Details of the region tracking operation performed on each frame within a scene are described with reference to FIG. 7. The first (upper left) macroblock from the frame is processed first (step 710).

If the current macroblock is not past the end of the frame (step 712), the macroblock is tested to determine if it has a motion vector (step 714). Even in P and B frames, which typically depend on information from reference frames, certain macroblocks may be "intra" coded. Such macroblocks will not have motion vectors. If a macroblock has no motion vectors, the macroblock will be skipped.

If motion vectors do exist, the motion vector type is analyzed (step 716). If the macroblock has a forward motion vector, the pixels of the macroblock are set as "hot" according to the pixels in the corresponding area of the forward reference frame (step 718). For example, in the P frame 304 of FIG. 3, the hot area of macroblock 326 is set identically to the hot area of the reference region 328 in the preceding I frame 300.

If the macroblock has a bidirectional motion vector, the pixels of the macroblock are first set as "hot" according to the pixels in the corresponding area of the forward reference frame (step 720). Then, more pixels in the macroblock may be set as "hot" according to the pixels in the corresponding area of the backward reference frame (step 722). Note that the backward reference frame is typically later in display order than the B frame being operated upon. Accordingly, it is important to observe that the tracking operation (FIG. 6) should take place in the decoding order of the MPEG video. That is, the tracking operation should operate on reference frames prior to predicted frames. In the clip 200 of FIG. 2, for example, the I frame 202 and the P frame 208 would be decoded and tracked before either of the B frames 204 or 206. Finally, pixels in the backward reference frame should be set as "hot" according to the pixels in the bidirectional macroblock being operated upon (step 724). This last step allows the hot region to be tracked from a predicted frame to a subsequent P or I frame.

After the macroblock has been fully processed or skipped, the macroblock number is incremented (step 726) and the next macroblock is processed or skipped (step 712). If the next macroblock is past the end of the frame, then the tracking operation is complete for the frame (step 728).

As discussed above, two advantages of the tracking operation are that objects that are temporarily partially obscured can frequently still be tracked, and that the shape and size of the tracked region are adaptive. Objects that are temporarily partially obscured are typically in that state for only a few frames. Consequently, as long as several reference frames depict the whole object, unobstructed, the predicted frames between those frames will often track the object correctly. With regard to the latter advantage, the adaptive shape and size provided by the invention, it should be noted that this attribute might not be advantageous in all cases. Consequently, in one embodiment of the invention, the hypervideo author is given the opportunity to constrict the size or shape of a tracked region to a regular polygon or other shape. This option, which will be described in further detail below with reference to FIG. 12, will often prevent undesired extraneous regions from being accidentally marked as hot by the tracking operation.

Figure 8:
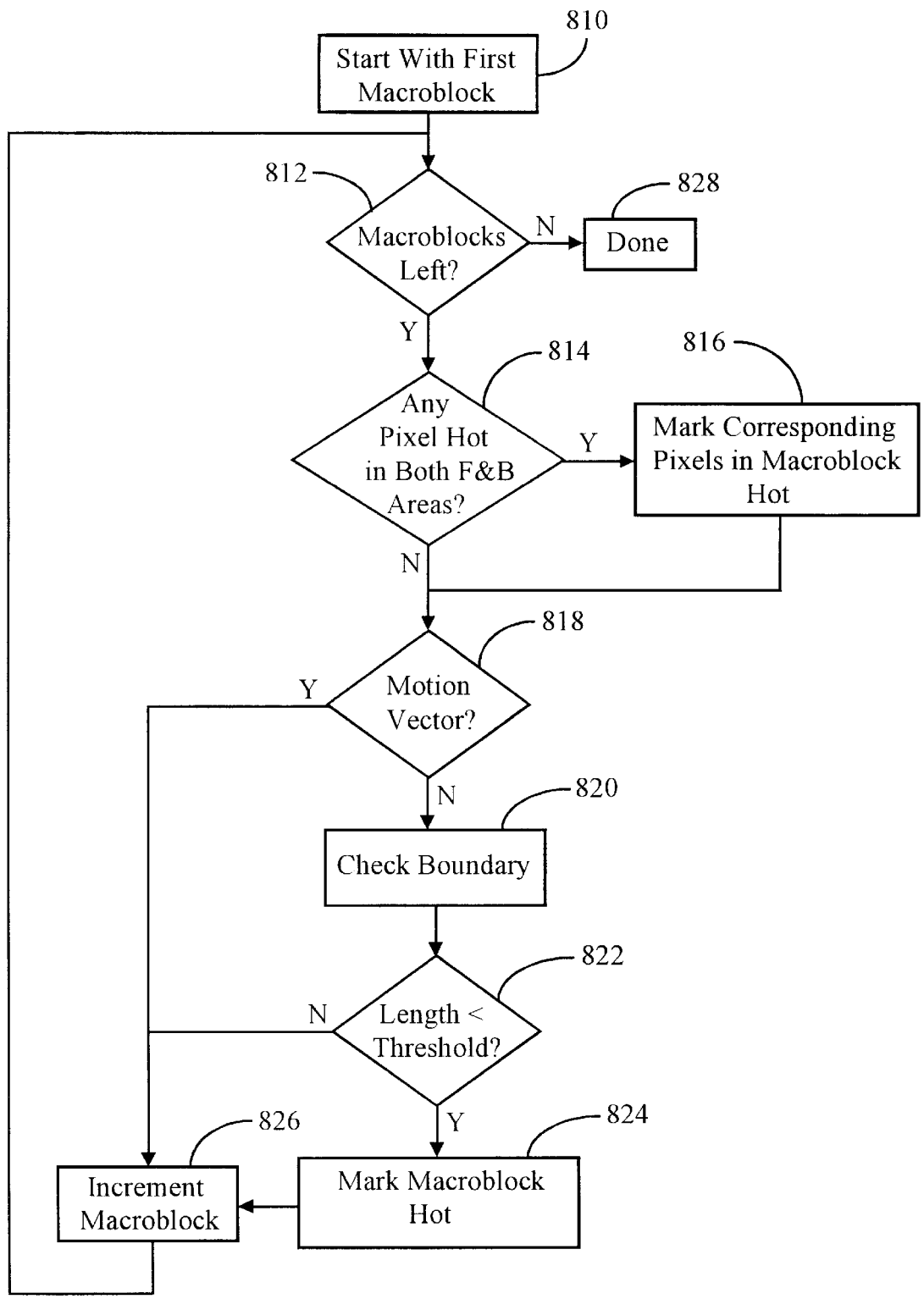
FIG. 8 is a flowchart illustrating the hole filling aspect of the motion tracking process utilized by the authoring system of FIG. 1.

The hole-filling portion of the tracking operation, which is performed on each tracked frame, is set forth in FIG. 8. The hole-filling operation is used to determine whether the macroblocks skipped in the tracking operation of FIG. 7 should be marked as hot. As discussed above, intra-coded macroblocks with no motion vector information are skipped by the motion tracking operation.

The hole-filling operation also begins on the first macroblock within the frame (step 810). As long as there are macroblocks left (step 812), every pixel in forward and backward reference areas, if any, corresponding to the current macroblock are examined. If one or more of the same pixels are hot in both the forward reference area and the backward reference area (step 814), then the corresponding pixels in the current macroblock are also marked as hot (step 816). Because hot regions are assumed to be substantially contiguous, the presence of hot pixels in exactly the same location in two successive reference frames implies that the corresponding pixels in the current frame should also be hot.

Then, each macroblock is checked for the presence of a motion vector (step 818). If there is any motion vector, the macroblock is skipped. Otherwise, the boundary of the macroblock is checked (step 820). If the pixels at the boundary of the macroblock have a certain fraction of hot pixels (e.g., more than 70%) (step 822), then the entire intra-coded macroblock within the boundary is also marked as hot (step 824).

The macroblock number is then incremented (step 826), and the remainder of the frame is processed (step 812). If there are no more macroblocks in the frame, then the hole-filling operation is complete (step 828).

Figure 9:
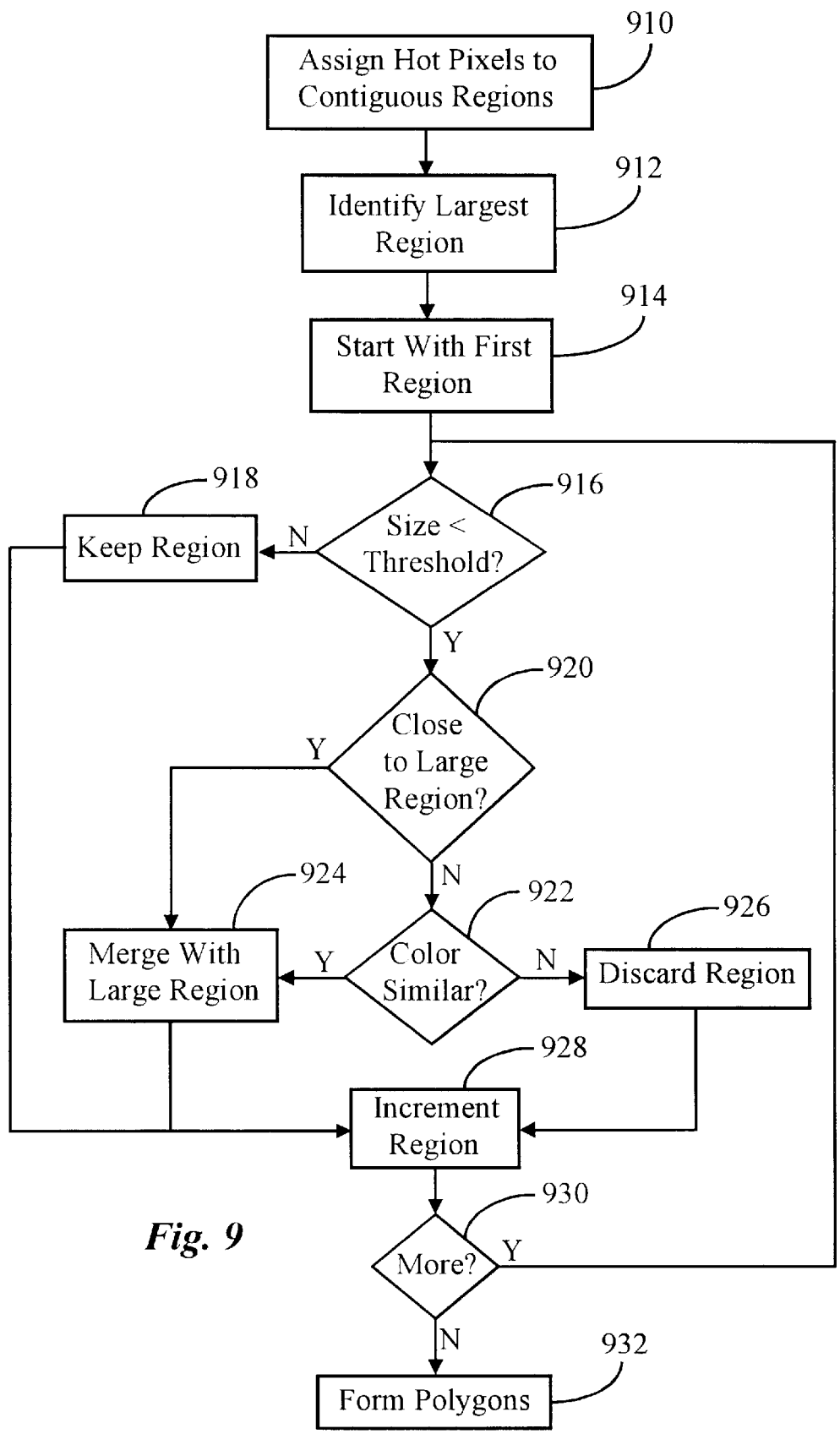
FIG. 9 is a flowchart illustrating a region refinement algorithm employed by the authoring system of FIG. 1.

When motion tracking and hole-filling are completed for the frame, the regions tracked are refined, preferably into contiguous regions. The process of FIG. 9 is used to accomplish this for each frame having tracked objects. First, all hot pixels are assigned to contiguous regions (step 910). This is done by scanning each frame's hot regions in a raster pattern, from top to bottom, and each line from left to right. When a hot pixel is encountered, it is assigned to a region of contiguous hot pixels. That is, if the current hot pixel is adjacent to other hot pixels, then the current pixel is assigned to the same region as the other pixels. In this manner, one or more contiguous regions of hot pixels will be formed.

The largest region of hot pixels is then identified (step 912). The largest region will contain the most hot pixels. Then, beginning with the first identified region (step 914), the size of the current region is compared to a threshold value (step 916), which is a predetermined fraction of the size of the largest region (e.g. 20%). If the current region is larger than the threshold, then it is kept as a separate region (step 918), and the process moves on. If not, its proximity to a sufficiently large region (e.g. one exceeding the threshold, or the largest region) is measured and compared to another threshold (step 920), which is also predetermined (e.g. eight pixels). If the small region is sufficiently close, it is merged with the nearby large region (step 924) and processing continues. If it is not sufficiently close, the color and brightness (i.e., DC Y and C values) of the small region's pixels are compared to the color of the nearest large region. If the color and brightness are close enough (e.g. 20 units out of 256) (step 922), then the region is merged with the larger region (step 924). If none of the tests are satisfied, the region is discarded (step 926) and is no longer considered hot.

The current region number is then incremented (step 928). If there are more regions to test (step 930), then the process repeats. Otherwise, each refined region is converted into a polygon (step 932) to reduce data storage requirements, and refinement is complete. It should be noted that the refined hot regions are converted into polygons (or other simple shapes) for storage only; subsequent object tracking is performed based on the bitmapped hot region before it is converted into a polygon.

When tracking, hole-filling, and refinement have reached the end of a scene (step 622, FIG. 6), a determination is made as to whether the tracking operation can continue using the same hot regions elsewhere in another scene of the video clip (step 428, FIG. 4). This can often be the case where there are two primary scenes to which the video clip switches back and forth. For example, a scene of an automobile traveling down a road may be interrupted by an interview scene. When the interview scene completes, the automobile scene may resume. It is a feature of the invention that objects, such as the automobile, may be tracked across certain scene boundaries.

Figure 10:
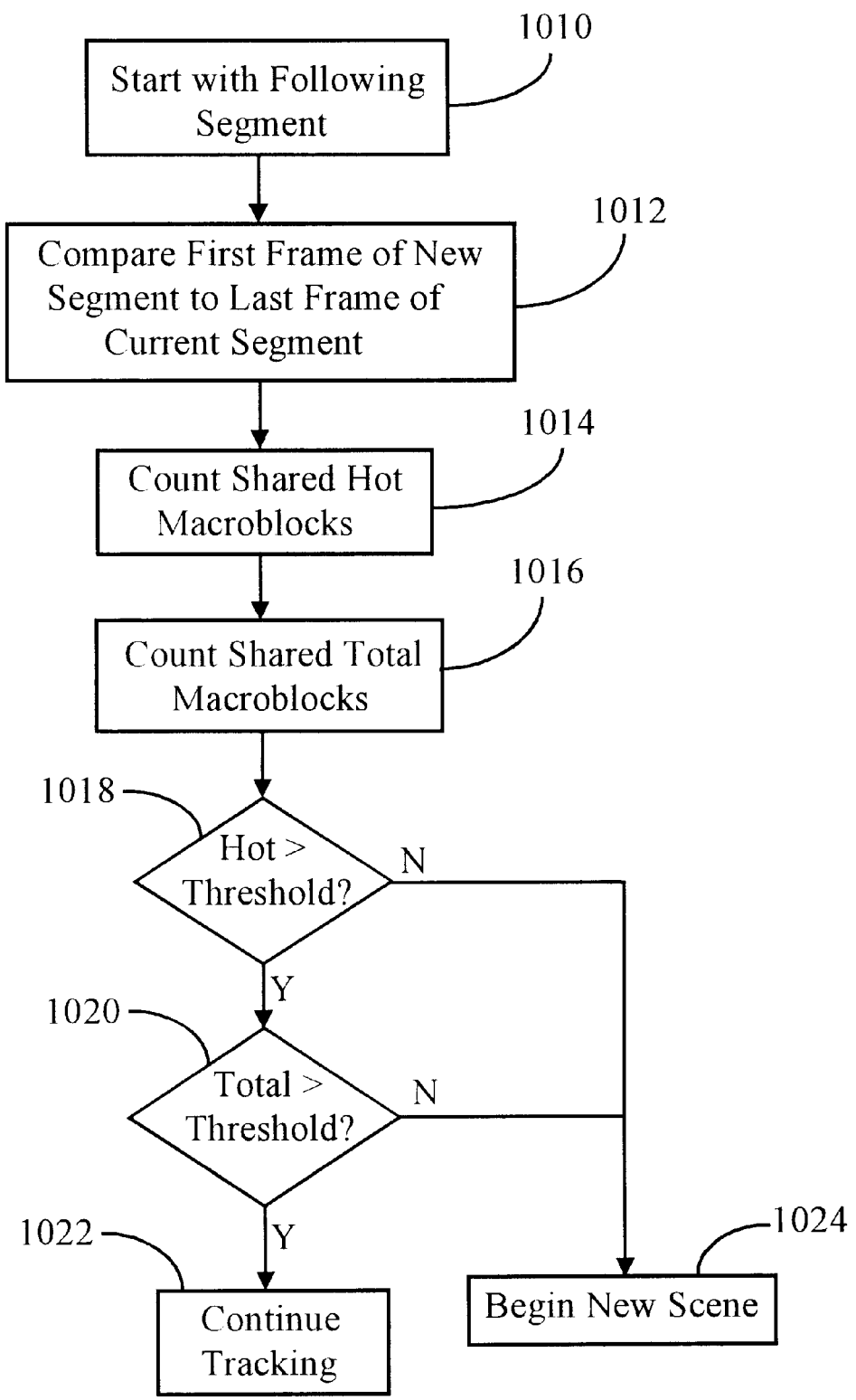
FIG. 10 is a flowchart illustrating the algorithm used by the authoring system of FIG. 1 to determine whether object tracking can be accomplished across a scene transition.

The scene-following aspect of the invention is described in the flowchart of FIG. 10. When motion tracking through a scene is finished, each following scene is examined to determine if it is a continuation of the completed scene. The immediately following segment is examined first (step 1010). The first frame of the new segment is compared, on a macroblock-by-macroblock basis, to the last frame of the current (completed) segment (step 1012). The hot macroblocks in the last frame are compared to the corresponding macroblocks in the first frame; the shared hot macroblocks (i.e., those having similar DC brightness and color values) are then counted (step 1014). The entire frame is also compared. The total number of shared macroblocks is also counted (step 1016). If the fraction of shared hot macroblocks exceeds a pre-set threshold, e.g. 60% (step 1018), and the fraction of shared total macroblocks exceeds a different threshold, e.g. 40% (step 1020), then the scene is deemed to continue, and motion tracking will also continue (step 1022). If both conditions are not satisfied, then a new scene begins (step 1024). Later scenes are tested in the same manner. If none of the later scenes correspond to the end of the current scene, then motion tracking ends there.

Figure 11:
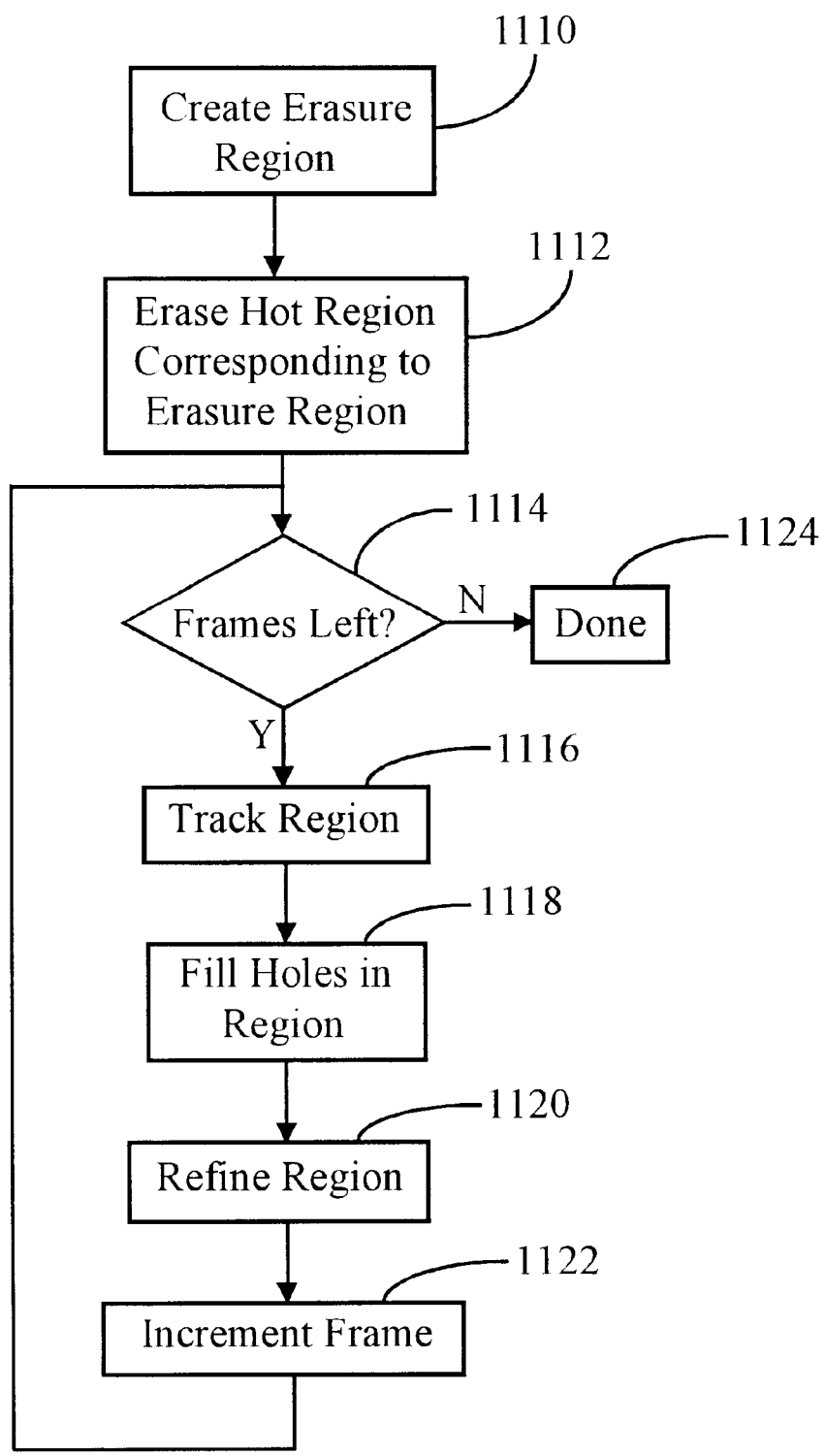
FIG. 11 is a flowchart illustrating the object erasure tracking method used by the authoring system of FIG. 1.

If the hypervideo author wishes to edit the refined tracked regions (step 434, FIG. 4), the process of FIG. 11 is employed. First, the author locates the first frame in which an edit, or erasure, is desired. The author then paints or draws an erasure region over the undesired portion of the tracked hot region (step 1110). The tracked erasure region is used to erase any corresponding portion of a hot region in the initial frame (step 1112). Stated another way, in the first frame of the edit, the edited hot region is the result of a logical AND operation between the preexisting hot region and the inverse of the "painted" erasure region.

The modified region is then tracked through the scene in a manner similar to that of FIG. 6. If any frames follow within the scene (step 1114), the modified hot regions are tracked from the current frame's reference frames, if any, to the current frame (step 1116). As with the object tracking operation, the algorithm for performing the erasure tracking operation is shown in FIG. 7. If any holes or gaps are found in the modified frame, then these holes are filled (step 1118). As above, the hole-filling operation is described in FIG. 8. The resulting hot regions are then refined into one or a small number of large regions (step 1120); the refinement algorithm is described in FIG. 9.

After the tracking, hole-filling, and refinement operations are performed in the erasure operation of FIG. 11, the frame number is incremented (step 1122) in decode order, and the same operations are performed on succeeding frames. If no frames are left (step 1114), then the scene is complete and erasure tracking is finished for the scene (step 1124). As discussed above, tracking may continue through additional scenes (step 438, FIG. 4); the additional scenes are identified by the algorithm of FIG. 10.

Figure 12:
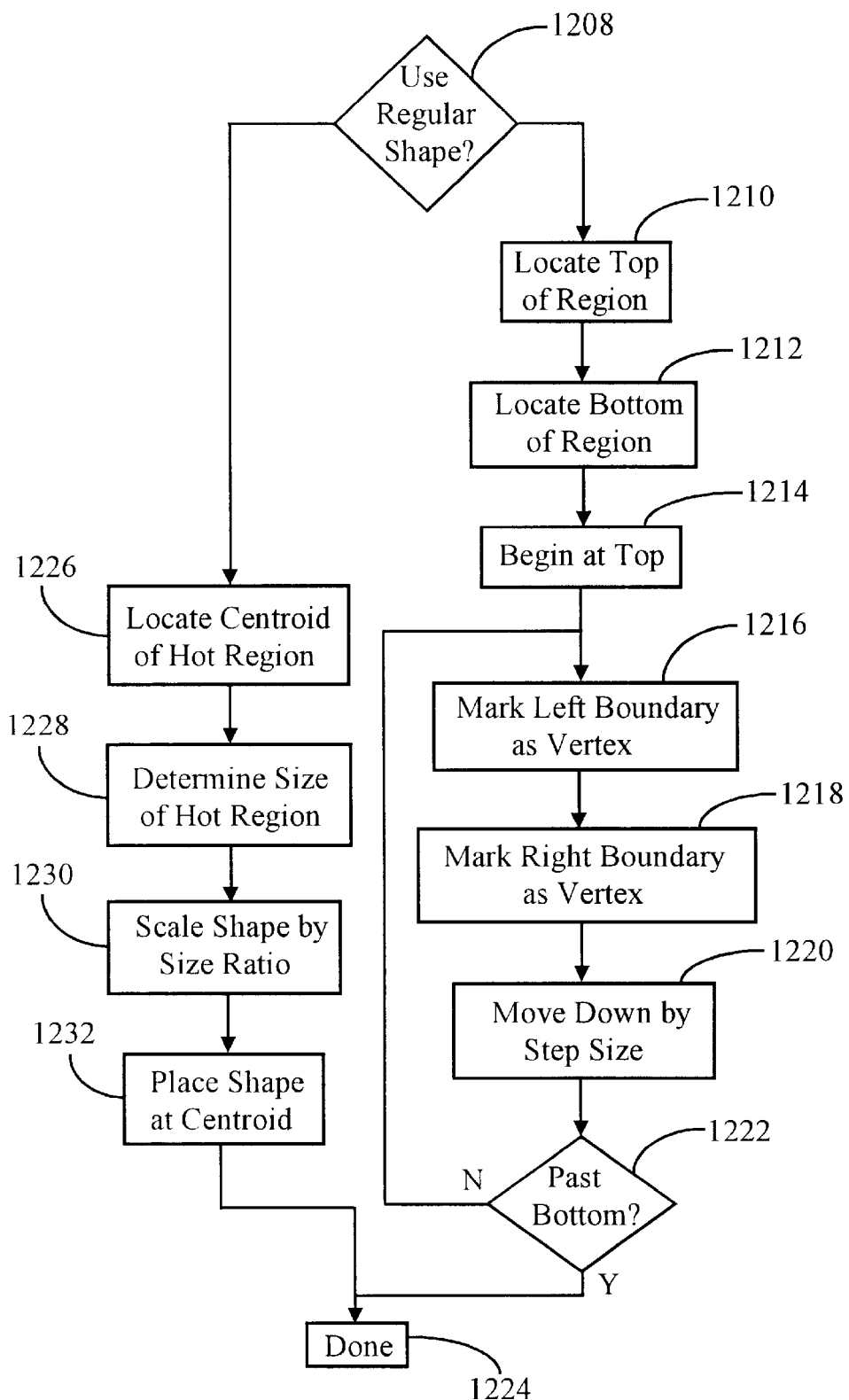
FIG. 12 is a flowchart illustrating the conversion of bitmapped hot regions to polygons as employed in the authoring system of FIG. 1.

Each refined hot region may be converted into a polygon (FIG. 9, step 932) via the process illustrated in FIG. 12. It has been found that polygons are generally simpler, smaller, and more efficient to store than the bitmaps used by the invention to track hot regions. If a polygon representation is to be used, once a region has been edited to the author's satisfaction, the invention converts the regions to polygons.

First, it is determined whether a regular shape representation is to be used by the invention (step 1208), as discussed above. If not, and arbitrary polygons can be used, then the top-most extent of a region (step 1210) and the bottom-most extent (step 1212) of a region are located. The polygon conversion process then begins at the top (step 1214). The left-most extent at the current vertical position is marked as a polygon vertex (step 1216). The right-most extent at the same vertical position is also marked as a vertex (step 1218). The process then steps downward by a pre-determined step size (e.g. sixteen pixels) (step 1220). If the new vertical position is not yet past the bottom-most extent (step 1222), the process is repeated and more vertices are added (steps 1216 and 1218). Otherwise, the vertical position is below the bottom of the region, and the process is complete (step 1224). Later, after optional shaping and refinement by the author, the polygon vertex position information is stored in a user-defined stream of the MPEG video file (step 446, FIG. 4).

If regular shape representations are to be used (step 1208), then a different shape generation algorithm is employed. First, the centroid of the hot region is located (step 1226). The centroid of a region is calculated by determining the average, or mean, horizontal and vertical locations of all pixels belonging to the region. For example, the centroid of a circle or ellipse is at the center of the region, and the centroid of a rectangle or parallelogram is at the intersection of the region's two diagonals.

The size of the hot region is then determined (step 1228). The size is simply the area of the region, or the number of pixels it contains. The shape used is then scaled (step 1230) by the ratio of the size of the hot region to the size of the region in the preceding reference frame. For example, if the specified shape is an ellipse, and the hot region is 10% larger than the ellipse was in the previous reference frame, then a 10% larger ellipse is used as the new hot region. The scaled shape is then placed (step 1230) at the centroid of the hot region previously determined, and the operation is complete (step 1224).

Figure 13:
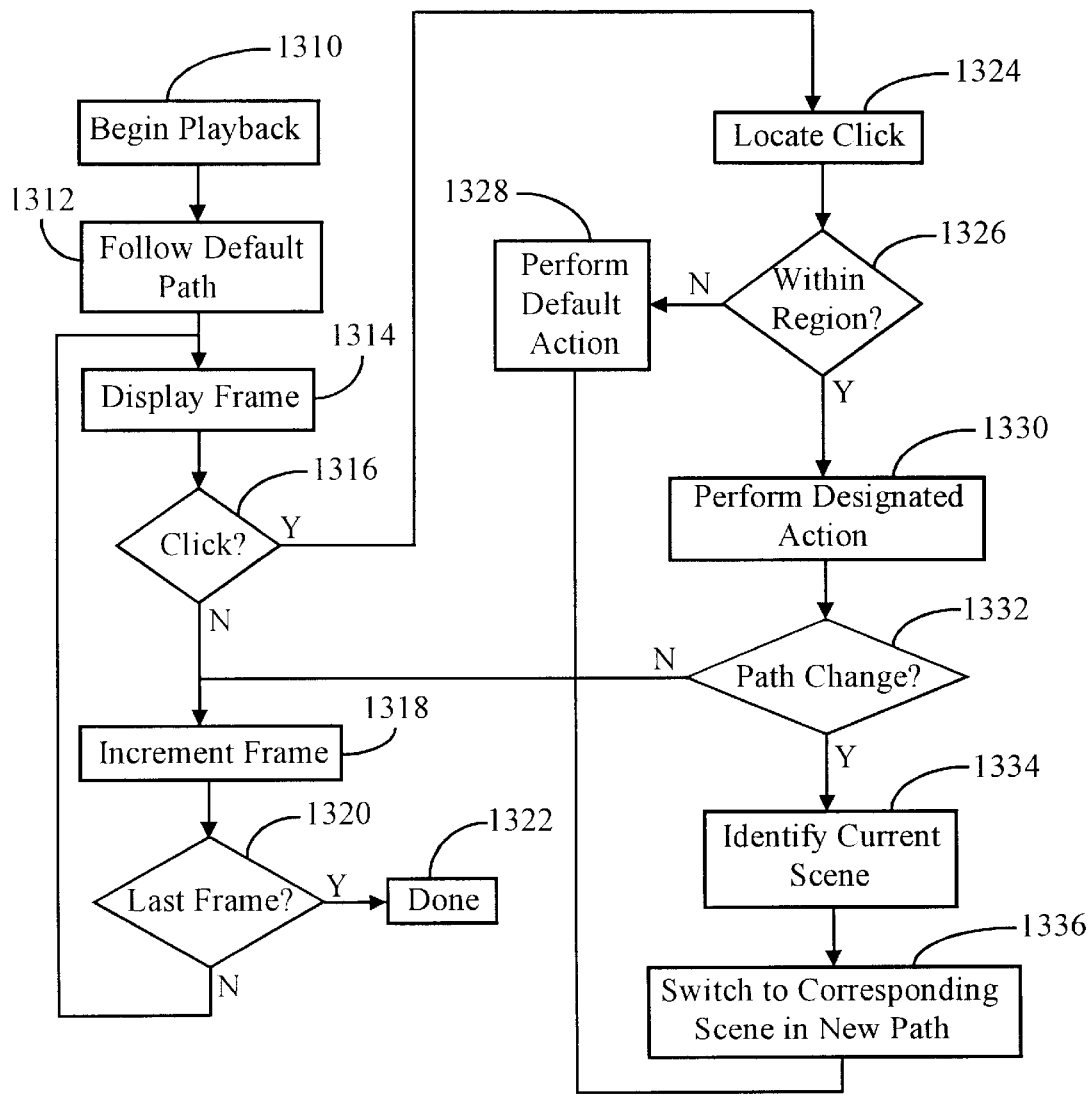
FIG. 13 is a flowchart illustrating the operation of the hypervideo browser of FIG. 1.

After the authoring phase is complete, a user can then use the hypervideo browser 124 (FIG. 1) of the invention to view the video and browse objects of interest. This procedure is documented by the flowchart of FIG. 13. First, video playback is begun (step 1310). The default path through the scenes of the video is initially followed (step 1312). A frame of the video is displayed (step 1314). If a "click" (or other selection) is made by the user (step 1316), processing is undertaken to handle the selection. Otherwise, the frame number is incremented (step 1318). If the displayed frame was the last frame (step 1320), then playback is ended (step 1322). Otherwise, another frame is displayed (step 1314).

Selection processing occurs as follows. The click or selection made by the user is located (step 1324), or given a horizontal and vertical position within a frame. The location is tested to determine whether it falls within a hot region (step 1326). If not, a default action is performed (e.g. an error message is displayed, such as "no active object was selected") (step 1328) and the frame is incremented as above (step 1318). If the selection falls within a hot region, the designated action corresponding to the region and frame is performed (step 1330). This action was originally specified during the authoring process (step 424, FIG. 4) and may have been modified for subsequent frames (step 430). As discussed above, the action might include displaying textual information, a still image, or another video clip, or a new program might be executed. Under certain circumstances, the author may have indicated that playback of the video be paused while the browser follows the specified action.

If the specified action includes a path change (step 1332), then the current scene number is identified (step 1334), and a switch is made to a corresponding scene in the new path (step 1336).

Playback of the video then continues by incrementing the frame number (step 1318).

In view of the above explanation of the exemplary system and method, it will be appreciated that embodiments of the present invention may be employed in many different applications to track objects in digital video clips. It should also be understood that while certain aspects of the invention are described functionally and structurally as though implemented in software, this is not a necessary limitation of the invention, as those aspects might be implemented by one of ordinary skill in the art in firmware or hardware.

It should further be noted that, although MPEG video compression is discussed in detail as the basis for the motion tracking operation of the invention, other video compression standards, including but not limited to H.261, utilize motion compensation techniques and thereby can be adapted for use with the invention.

While certain exemplary structures and operations have been described herein, the appropriate scope hereof is deemed to be in accordance with the claims as set forth below.

What is claimed is:

1. A method for object tracking in a digital video environment, comprising the steps of:
    identifying an object in a frame of the video; and
    tracking an object, utilizing motion compensation information stored in the video, through at least one scene of the video to produce a hot region.
2. The method of claim 1 wherein the video is an MPEG-compressed digital video clip.
3. The method of claim 1, wherein the identifying step comprises the substeps of:
    locating a point within the object; and
    determining the boundaries of the object.
4. The method of claim 3, wherein the determining step comprises the substeps of:
    approximating the contents of the frame; and
    attributing all pixels contiguous to the point and within a range of color and brightness values to the object.
5. The method of claim 4, wherein the approximating step utilizes DC coefficients from color and brightness blocks in the frame.
6. The method of claim 1, wherein the tracking step comprises the substeps of:
    identifying a current scene in which to track the object;
    specifying the hot region in a first frame of the current scene to correspond to the object;
    finding the object in each subsequent frame in the current scene.
7. The method of claim 6, wherein the finding step comprises the substeps of:
    identifying a forward motion vector for each macroblock in the frame, wherein the forward motion vector corresponds to a forward reference area in a forward reference frame; and
    copying any portion of the hot region from the forward reference area to the macroblock.
8. The method of claim 7, wherein the finding step further comprises the substeps of:
    identifying a backward motion vector for each macroblock in the frame, wherein the backward motion vector corresponds to a backward reference area in a backward reference frame;
    copying any portion of the hot region from the backward reference area to the macroblock; and
    copying any portion of the hot region from the macroblock to the backward reference area.
9. The method of claim 6, wherein the tracking step further comprises filling holes in the hot region.
10. The method of claim 6, wherein the tracking step further comprises the substeps of:
    locating scene transitions in the video;
    determining whether a later scene corresponds to the end of the current scene; and
    if so, continuing to track the object in the later scene.
11. The method of claim 10, further comprising the step of refining the hot region.
12. The method of claim 10, wherein the refining step comprises the substeps of:
    identifying at least two contiguous hot subregions corresponding to the tracked object;
    determining whether each of the hot subregions corresponds to the object;
    if not, discarding a hot subregion; and
    if so, merging the hot subregions into a merged hot region.
13. The method of claim 1, wherein the hot region is represented as a bitmap.
14. The method of claim 13, further comprising the step of converting the hot region to a polygon.
15. The method of claim 14, further comprising the step of storing the polygon in the video.
16. The method of claim 1, further comprising the step of specifying an action for the object.
17. The method of claim 16, further comprising the steps of:
    playing the video;
    waiting for a user to select an object; and
    upon selection, performing the specified action.
18. The method of claim 16, wherein the video comprises a plurality of scenes and a default path through the scenes.
19. The method of claim 18, further comprising the step of identifying at least one alternate path through the scenes.
20. The method of claim 19, wherein the specified action comprises switching from the default path to the alternate path.
21. The method of claim 17, wherein the specified action comprises linking to additional information to be displayed.
22. The method of claim 1, further comprising the step of converting the hot region to a regular shape.
23. The method of claim 22, wherein the converting step preserves a specified shape.
24. The method of claim 23, wherein the converting step comprises the steps of:
    locating a centroid for the hot region;
    determining a size of the hot region; and
    using the centroid and the size to place the regular shape.
25. A method for object tracking and editing in a digital video environment, comprising the steps of:
    tracking an object through at least one scene of the video to produce a hot region;
    identifying an erasure region of an object in a frame of the video;
    editing the object by identifying and tracking the erasure region; and erasing any portion of the hot region corresponding to the erasure region.

26. The method of claim 25, wherein the video environment is an MPEG-compressed digital video clip.

27. The method of claim 25, wherein the identifying step comprises the substeps of:

locating a point within the object; and determining the boundaries of the object.

28. The method of claim 1, wherein the tracking step comprises the substeps of:

locating scene transitions in the video;

determining whether a later scene corresponds to the end of the current scene; and if so, continuing to track the object in the later scene.

* * * * *